(12) United States Patent
D'Aguanno et al.

(10) Patent No.: US 6,414,780 B1
(45) Date of Patent: Jul. 2, 2002

(54) PHOTONIC SIGNAL REFLECTIVITY AND TRANSMISSIVITY CONTROL USING A PHOTONIC BAND GAP STRUCTURE

(76) Inventors: Giuseppe D'Aguanno, Via Arigni 142, Cassino (FR) (IT), 03042; Marco Centini, Via Fanfulla da Lodi 15, San Benedetto del Tronto (AP) (IT), 63039; Concita Sibilia, Via Francesco Redi 5, 00161 Roma (IT); Michael Scalora, 15037 Ashmont Cir., Huntsville, AL (US) 35803; Mark Bloemer, 15829 Sanderson La., Athens, AL (US) 35613

(*) Notice: Subject to any disclaimer, the term of this patent is extended or adjusted under 35 U.S.C. 154(b) by 0 days.

(21) Appl. No.: 09/471,036

(22) Filed: Dec. 23, 1999

(51) Int. Cl.[7] .............................. G02F 1/03; G02F 1/295

(52) U.S. Cl. .......................................... 359/241; 385/5

(58) Field of Search ................................ 359/321, 240, 359/241, 244, 322; 385/4, 5, 131

(56) References Cited

U.S. PATENT DOCUMENTS

| | | | |
|---|---|---|---|
| 3,410,625 A | 11/1968 | Edwards | 350/166 |
| 3,637,294 A | 1/1972 | Berthold, III | 350/166 |
| 3,682,528 A | 8/1972 | Apfel et al. | 350/1 |
| 3,697,153 A | 10/1972 | Zycha | 350/166 |
| 3,698,946 A | 10/1972 | Kaspaul et al. | 117/211 |
| 3,706,485 A | 12/1972 | Fawcett et al. | 350/164 |
| 3,759,604 A | 9/1973 | Thelen | 350/166 |
| 3,853,386 A | 12/1974 | Ritter et al. | 350/164 |
| 3,885,855 A | 5/1975 | Gross | 350/1 |
| 3,889,026 A | 6/1975 | Groth | 428/34 |
| 3,901,997 A | 8/1975 | Groth | 428/428 |
| 3,914,023 A | 10/1975 | Thelen | 350/164 |
| 3,978,273 A | 8/1976 | Groth | 428/434 |
| 4,179,181 A | 12/1979 | Chang | 350/1.7 |

(List continued on next page.)

FOREIGN PATENT DOCUMENTS

| | | |
|---|---|---|
| EP | 0 012 439 A1 | 12/1979 |
| EP | 0 782 017 A2 | 7/1997 |
| EP | 0 782 017 A3 | 8/1998 |
| GB | 1406940 | 9/1975 |
| JP | 59-151108 | 8/1984 |
| JP | 64-80908 | 3/1989 |
| JP | 2-187732 | 7/1990 |
| WO | WO 96/11516 | 4/1996 |
| WO | WO 99/52015 | 10/1999 .............. G02F/1/37 |

OTHER PUBLICATIONS

Ashcroft, Neil W. and Mermin, N. David, *Solid State Physics*, Holt, Rinehart and Winston, 1976, pp. xi–xiii and 765–766.

Assanto, Gaetano, "Quadratic Cascading: Effects and Applications," *Beam Shaping and Control with Nonlinear Optics*, (ed. By Kajzar and Reinisch), Plenum Press, pp. vii–viii and 341–374.

Ball, G.A. and Morey, W.W., "Continuously tunable single–mode erbium fiber laser," *Optics Letters*, Optical Society of America, vol. 17, No. 6, Mar. 15, 1992, pp. 420–422.

(List continued on next page.)

*Primary Examiner*—Huy Mai
(74) *Attorney, Agent, or Firm*—Sterne, Kessler, Goldstein & Fox P.L.L.C.

(57) ABSTRACT

Non-linear reflectivity and non-linear transmissivity of a first photonic signal incident on a photonic band gap (PBG) structure are controlled by applying a second photonic signal to the PBG structure while the first photonic signal is incident on the PBG structure. The first and second photonic signals have respective frequencies near a low frequency, first order band gap edge and a high frequency, second order band gap edge resonance peak of the PBG structure. The first photonic signal undergoes enhanced non-linear gain near the band gap edges when a predetermined phase difference is imposed between the first and second photonic signals, resulting in dramatic reflectivity and transmissivity changes for a band gap structure of only a few microns in length.

31 Claims, 6 Drawing Sheets

U.S. PATENT DOCUMENTS

| | | | |
|---|---|---|---|
| 4,189,205 A | 2/1980 | Vandehei | 350/1.7 |
| 4,229,066 A | 10/1980 | Rancourt et al. | 350/1.6 |
| 4,240,696 A | 12/1980 | Tracy et al. | 350/163 |
| 4,269,481 A | 5/1981 | Yeh et al. | 350/356 |
| 4,441,789 A | 4/1984 | Pohlack | 350/166 |
| 4,488,775 A | 12/1984 | Yamamoto | 350/164 |
| 4,525,687 A | 6/1985 | Chemla et al. | 332/7.51 |
| 4,556,277 A | 12/1985 | Fan et al. | 350/1.7 |
| 4,590,118 A | 5/1986 | Yatabe et al. | 428/215 |
| H182 H | 1/1987 | Heller | 340/568 |
| 4,726,655 A | 2/1988 | Mahlein | 350/166 |
| 4,756,602 A | 7/1988 | Southwell et al. | 350/166 |
| 4,770,496 A | 9/1988 | Mahlein | 350/166 |
| 4,773,717 A | 9/1988 | Pai et al. | 350/3.7 |
| 4,838,648 A | 6/1989 | Phillips et al. | 350/166 |
| 4,846,551 A | 7/1989 | Rancourt et al. | 350/166 |
| 4,915,494 A | 4/1990 | Shipley et al. | 350/641 |
| 5,035,485 A | 7/1991 | Kageyama | 350/164 |
| 5,071,206 A | 12/1991 | Hood et al. | 359/360 |
| 5,111,329 A | 5/1992 | Gajewski et al. | 359/275 |
| 5,119,232 A | 6/1992 | Daley et al. | 359/359 |
| 5,148,504 A | 9/1992 | Levi et al. | 385/14 |
| 5,170,290 A | 12/1992 | Land et al. | 359/579 |
| 5,179,468 A | 1/1993 | Gasloli | 359/359 |
| 5,187,461 A | 2/1993 | Brommer et al. | 333/219.1 |
| 5,212,584 A | 5/1993 | Chung | 359/260 |
| 5,225,930 A | 7/1993 | Land et al. | 359/578 |
| 5,233,464 A | 8/1993 | Costich | 359/359 |
| 5,239,406 A | 8/1993 | Lynam | 359/275 |
| 5,247,528 A | 9/1993 | Shinozaki et al. | 372/22 |
| 5,262,894 A | 11/1993 | Wheatley et al. | 359/586 |
| 5,268,785 A | 12/1993 | Crenshaw et al. | 359/244 |
| 5,302,449 A | 4/1994 | Eby et al. | 428/336 |
| 5,315,430 A | 5/1994 | Brennan et al. | 359/248 |
| 5,315,437 A | 5/1994 | Alfano et al. | 359/588 |
| 5,337,183 A | 8/1994 | Rosenblatt | 359/248 |
| 5,345,328 A | 9/1994 | Fritz et al. | 359/248 |
| 5,355,245 A | 10/1994 | Lynam | 359/267 |
| 5,372,874 A | 12/1994 | Dickey et al. | 428/216 |
| 5,406,573 A | 4/1995 | Ozbay et al. | 372/43 |
| 5,424,559 A | 6/1995 | Kasahara | 257/21 |
| 5,433,988 A | 7/1995 | Fukuda et al. | 428/141 |
| 5,440,421 A | 8/1995 | Fan et al. | 359/344 |
| 5,448,404 A | 9/1995 | Schrenk et al. | 359/584 |
| 5,457,570 A | 10/1995 | Lu et al. | 359/361 |
| 5,471,180 A | 11/1995 | Brommer et al. | 333/202 |
| 5,480,722 A | 1/1996 | Tomonaga et al. | 428/428 |
| 5,493,442 A | 2/1996 | Buchholz et al. | 359/359 |
| 5,506,037 A | 4/1996 | Termath | 428/216 |
| 5,506,919 A | 4/1996 | Roberts | 385/1 |
| 5,513,039 A | 4/1996 | Lu et al. | 359/584 |
| 5,514,476 A | 5/1996 | Hartig et al. | 428/426 |
| 5,552,882 A | 9/1996 | Lyons et al. | 356/73.1 |
| 5,557,462 A | 9/1996 | Hartig et al. | 359/585 |
| 5,559,825 A | 9/1996 | Scalora et al. | 372/96 |
| 5,563,734 A | 10/1996 | Wolfe et al. | 359/360 |
| 5,591,529 A | 1/1997 | Braatz et al. | 428/457 |
| 5,595,825 A | 1/1997 | Guiselin | 428/428 |
| 5,615,289 A | 3/1997 | Duck et al. | 385/24 |
| 5,740,287 A * | 4/1998 | Scalora et al. | 385/6 |
| 5,751,466 A * | 5/1998 | Dowling et al. | 359/248 |
| 5,796,902 A | 8/1998 | Bhat et al. | 385/122 |
| 5,801,378 A | 9/1998 | Hane et al. | 250/237 |
| 5,907,427 A | 5/1999 | Scalora et al. | 359/248 |
| 5,909,035 A | 6/1999 | Kim | 257/59 |
| 5,943,155 A | 8/1999 | Goossen | 359/247 |
| 5,949,571 A | 9/1999 | Goossen et al. | 359/291 |
| 6,028,693 A | 2/2000 | Fork et al. | 359/248 |

OTHER PUBLICATIONS

Bendickson, J.M. et al., "Analytic expressions for the electromagnetic mode density finite, one–dimensional, photonic band–gap structures," *Physical Review, E*, The American Physical Society, vol. 53, No. 4–B, Apr. 1996, pp. 4107–4121.

Bloemer, M.J. and Scalora, M., "Transmissive properties of AG/MgF, photonic band gaps," *Applied Physics Letters*, American Institute of Physics, vol. 72, No. 14, Apr. 6, 1998, pp. 1676–1678.

Bouché, N. er al., "Dynamics of gain in vertical cavity lasers and amplifiers at 1.53 βm using femtosecond photoexcitation," *Applied Physics Letters*, American Institute of Physics, vol. 73, No. 19, Nov. 9, 1998, pp. 2718–2720.

Centini, M. et al., "Dispersive properties of finite, one–dimensional photonic band gap structures: Applications to nonlinear quadratic interactions," *Physics Review E*, The American Physical Society, vol. 60, No 4–B, Oct. 1999, pp 4891–4898.

Cojocaru, C. et al., "Active reflection via a phase–insensitive quadratic interaction within a microcavity," *Applied Physics Letters*, American Institute of Physics, vol. 74, No. 4, Jan. 25, 1999, pp. 504–506.

D'Aguanno, G.D. et al., "Enhancement of $\chi^{(2)}$ cascading processes in one–dimensional photonic bandgap structures," *Optics Letters*, Optical Society of America, vol. 24, No. 23, Dec. 1, 1999, pp. 1663–1665.

DeSalvo, R. et al., "Self–focusing and self–defocusing by cascading second–order effects in KTP," *Optics Letters*, Optical Society of America, vol. 17, No. 1, Jan. 1, 1992, pp. 28–30.

Dialog File 348 (European Patents) English Language Patent Abstract for EP 0 012 439 A1, published Jun. 25, 1990, p. 1.

Dialog File 347 (JPO & JAPIO) English Language Patent Abstract for JP 59–151108, published Aug. 29, 1984, p. 1.

Dowling, J.P. et al., "The photonic band edge laser: A new approach to gain enhancement," *Journal of Applied Physics*, American Institute of Physics, vol. 75, No. 4, Feb. 15, 1994, pp. 1896–1899.

Fowles, Grant R., *Introduction to Modern Optics*, Second Edition, 1975, Holt, Rhinehart and Winston, pp. v–viii, 33–38, 52–55 and 96–103.

Grétillat, M.–A. et al., "Electrostatic Polysilicon Microrelays Integrated with MOSFETs", Proceedings Of Micro Electro Mechanical Systems, IEEE, Jan. 25–28, 1994, pp. 97–101.

Haus, J.W. et al., "Enhanced second–harmonic generation in media with a weak periodicity," Physical Review A, The American Physical Society, vol. 57, No. 3, Mar. 1988, pp. 2120–2128.

"Indicators and displays," Machine Design: 1988 Reference Issue Series, Penton Publishing Inc., May 19, 1988, pp. 190–200.

Joannopoulos, John D. et al., Photonic Crystals: Molding the Flow of Light, 1995, Princeton University Press, (copy of entire book provided).

Lewis, C.F., "Optical Coatings: More Than Meets the Eye," Materials Engineering, Penton Publishing Inc., Nov. 1989, pp. 29–32.

Macleod, H.A., *Thin–Film Optical Filters*, Second Edition, 1986, Macmillan Publishing Company, (copy of entire book provided).

Marion, Jerry B., Classical Electromagnetic Radiation, 1965, Academic Press Inc., pp. ix–xv, 148–152, 170–177.

Martorell, J. et al., "Pseudo–metal reflection at the interface between a linear and a nonlinear material," *Optics Communications*, Elesevier Science B.V., vol. 144, Nos. 1–3, Dec. 1, 1997, pp. 65–69.

Mooney, T.A., "Which Coating Process Should I Choose?," *Lasers & Optronics*, Jul. 1988, pp. ix–xvii and 177–239.

Patent Abstracts of Japan, vol. 018, No. 095 (E–1509), JP 05 299751, A, published Nov. 12, 1993.

Patent Abstracts of Japan, vol. 014, No. 468 (P–1115), JP 2187732, published Jul. 23, 1990.

Patent Abstracts of Japan, vol. 008, No. 081 (E–238), JP 59 000977 A, published Jan. 6, 1984.

Petersen, K.E., "Micromechanical Membrane Swithces on Silicon," *IBM J. Res. Develop.*, vol. 23, No. 4, Jul. 1979, pp. 376–385.

Rao, Y.J. et al., "Spatially–multiplexed fiber–optic Bragg grating strain and temperature sensor system based on interferometric wavelength–shift detection," *Electronics Letters*, The Institute of Electrical Engineers, vol. 31, No. 12, Jun. 8, 1995, pp. 1009–1010.

Scalora, M. and Crenshaw, M.E., "A beam propagation method that handles reflections," *Optics Communications*, Elsevier Science B.V., vol. 108, Nos. 4–6. Jun. 1, 1994, pp. 191–196.

Scalora, M. et al., "Dipole emission rates in one–dimensional (phtonic band–gap materials," *Applied Physics B*, Supplement to vol. B 60, N. 2/3, 1995, Springer–Verlag, pp. S57–S61.

Scalora, M. et al., "Optical Limiting and Switching of Ultrashort Pulses in Nonlinear Photonic Band–Gap Materials," *Physical Review Letters*, The American Physical Society, vol. 73, No. 10, Sep. 5, 1994, pp. 1368–1371.

Scalora, M. et al., "The photonic band–edge optical diode" *Journal of Applied Physics*, American Institute of Physics, vol. 76, No. 4, Aug. 15, 1994, pp. 2023–2026.

Scalora, M. et al., "Pulse propagation near highly reflective surfaces: applications to photonic band–gap structures and the question of superluminal tunneling times," *Physical Review A.*, The American Physic Society, The American Society, vol. 52, No. 1, Jul. 1995, pp. 726–734.

Scalora, M. et al., "Pulsed second–harmonic generation in non–linear, one–dimensional, periodic structures," *Physical Review A*, The American Physical Society, vol. 56, No. 4, Oct. 1997, pp. 3166–3174.

Scalora, M. et al., "Ultrashort pulse propagation at the photonic band edge: large tunabale group delay with minimal distortion and loss," *Physical Review E*, The American Physical Society, vol. 54, No. 2, Aug. 1996, pp. R1078–R1081.

Sprung, D.W.L. et al., "Scattering by a finite periodic potential," *American Journal o Physics*, American Association of Physics Teachers, vol. 61, No. 12, Dec. 1993, pp. 1118–1124.

Sze, S.M. *Physics of Semiconductor Devices*, Second Edition, 1981, John Wiley & Sons, pp. ix–xii and 681–742.

Sze, S.M., *Semiconductor Devices: Physics & Technology*, 1985, John Wiley & Sons, pp. ix–xi and 252–467.

Tocci, M.D., et al., "Thin–film nonlinear optical diode," *Applied Physics Letters*, American Institute of Physics, vol. 66, No. 18, May 1, 1995, pp. 2324–2326.

Ward, A.J. et al., "Photonic dispersiion surfaces," *Journal of Physics: Condensed Matter*, IOP Publishing Ltd., vol. 7, No. 10, Mar. 6, 1995, pp. 2217–2224.

Yao, J.J. et al., "Surface Micromachined Miniature Switch for Telecommunications Applications with Signal Frequencies from DC up to 4 Ghz," *Transducers '95*, Foundation for Sensor and Actuator Technology, 1995, pp. 384–387.

Yariv, Amnon and Yeh, Pochi, *Optical Waves in Crystals: Progagation and Control of Laser Radiation*, 1984, John Wiley & Sons, pp. vii–xi and 439–447.

Akhmediev, N. et al., "Stability analysis of even and odd waves of symmetric nonlinear plana optical waveguides," *J. Opt. Soc. Am. B*, Optical Society of America, vol. 10, No. 2, Feb. 1993, pp. 230–236.

Bowden, C.M. et al., "Development and Applications of Materials Exhibiting Photonic Band Gaps," *J. Opt. Soc. Am. B*, Optical Society of America, vol. 10 , No. 2, Feb 1993, pp. 279–280.

Brown, E.R. et al., "Radiation properties of a planar antenna on a photonic–crystal substrate," *J. Opt. Soc. Am. B*, Optical Society of America, vol. 10, No. 2, Feb. 1993, pp. 404–407.

Bullock, D.L. et al., "Photonic band structure investigation of two–dimensional Bragg reflector mirrors for semiconductor laser mode control." *J. Opt. Soc. Am. B*, Optical Society of America, vol. 10, No. 2, Feb. 1993, pp. 399–403.

Chernov, V.E. and B.A. Zon, "Depolarization of laser radiation in a nonlinear medium," *J. Opt. Soc. Am. B*, Optical Society of America, vol. 10, No. 2, Feb. 1993, pp. 210–212.

Chu, D.Y. and S.–T. Ho, "Spontaneous emission from excitons in cylindrical dielectric waveguides and the spontaneous–emission factor of microcavity ring lasers," *J. Opt. Soc. Am. B*, Optical Society of America, vol. 10, No. 2, Feb. 1993, pp. 381–390.

Crook, R.J. et al., "Long–range optical modes supported by a strongly absorbing thin organic film," *J. Opt. Soc. Am. B*, Optical Society of America, vol. 10, No. 2, Feb. 1993, pp. 237–243.

De Martini, F. et al., "Spontaneous and stimulated emissions in the thresholdless microlaser," *J. Opt. Soc. Am. B*, Optical Society of America, vol. 10, No. 2, Feb. 1993, pp. 360–380.

Dowling, J.P. and C.M. Bowden, "Beat radiation from dipoles near a photonic band edge," *J. Opt. Soc. Am. B*, Optical Society of America, vol. 10 , No. 2, Feb. 1993, pp. 253–355.

Dutta, B. et al., "Squeezed states, photon–number distributions, and U(1) invariance," *J. Opt. Soc. Am. B*, Optical Society of America, vol. 10, No. 2, Feb. 1993, pp. 391–398.

Erdogan, T. et al., "Enhancement and inhibition of radiation in cyclindrically symmetric, periodic structures," *J. Opt. Soc. Am. B*, Optical Society of America, vol. 10, No. 2, Feb. 1993, pp. 391–398.

Gaylord, T.K. et al., "Applications of electromagnetics formalism to quantum–mechanical electron–wave propagation in semiconductors," *J. Opt. Soc. Am. B*, Optical Society of America, vol. 10, No. 2, Feb. 1993, pp. 333–339.

Genack, A.Z. and N. Garcia, "Electromagnetic localizatin and photonics," *J. Opt. Soc. Am. B*, Optical Society of America, vol. 10, No. 2, Feb. 1993, pp. 408–413.

Helmfrid, S. et al., "Influence of various imperfections on the conversion efficiency of second–harmonic generation in quasi–phase–matching lithium niobate waveguides," *J. Opt. Soc. Am. B*, Optical Society of America, vol. 10, No. 2, Feb. 1993, pp. 222–229.

Kilin, S.Ya, and I.I. Fedchenia, "Statistics of random spikes in the intensity of stimulated Raman scattering: inhalation by spatially distributed fluctuations," *J. Opt. Soc. Am. B*, Optical Society of America, vol, 10, No. 2, Feb. 1993, pp. 199–209.

Kurizki, G. et al., "Quantum electrodynamics in photonic band gaps:atomic–beam interactions with a defect mode," *J. Opt. Soc. Am. B*, Optical Society of America, vol. 10, No. 2, Feb. 1993, pp. 346–352.

Leoński, W., "Squeezed–state effect on bound–continuum transitions," *J. Opt. Soc. Am. B*, Optical Society of America, vol. 10, No. 2, Feb. 1993, pp. 244–252.

Leung, K.M., "Defect modes in photonic band structures:a Green's function approach using vector Wannier functions," *J. Opt. Soc. Am. B*, Optical Society of America, vol. 10, No. 2, Feb. 1993, pp. 303–306.

Maradudin, A.A. and A.R. McGurn, "Photonic band structure of a truncated, two–dimensional, periodic dielectric medium," *J. Opt. Soc. Am, B*, Optical Society of America, vol. 10, No. 2, Feb. 1993, pp. 307–313.

Meade, R.D. et al., "Nature of the photonic band gap:some insights from a field analysis," *J. Opt. Soc/ Am. B*, Optical Society of America, vol. 10, No. 2, Feb. 1993, pp. 328–332.

Montemezzani, G. et al., "Photorefractive charge compensation at elevated temperatures and application to $KNbO_3$," *J. Opt. Soc. Am. B*, Optical Society of America, vol. 10, No. 2, Feb. 1993, pp. 171–185.

Mossberg, T.W. and M. Lewenstein, "Radiative properties of strongly driven atoms in the presence of photonic bands and gaps," *J. Opt. Soc. Am. B*, Optical Society of America, vol. 10, No. 2, Feb. 1993, pp. 340–345.

Robertson, W.M. et al., "Measurement of the photon dispersion relation in two–dimensional ordered dielectric arrays," *J. Opt. Soc. Am. B*, Optical Society of America, vol. 10, No. 2, Feb. 1993, pp. 322–327.

Smith, D.R. et al., "Photonic band structure and defects in one and two dimensions," *J. Opt. Soc. Am. B*, Optical Society of America, vol. 10, No. 2, Feb. 1993, pp. 314–321, Söziier, H. Sami and J. W. Haus, "Photonic bands: simple–cubic lattice" *J. Opt. Soc. Am, B*, Optical Society of America, vol. 10, No. 2, Feb. 1993, pp. 296–302.

Sugawara, T. et al., "Instability in a $CO_2$ sequence–band laser with a saturable absorber and vibration–to–vibration energy transfer processes," *J. Opt. Soc. Am. B*, Optical Society of America, vol. 10, No. 2, Feb. 1993, pp. 265–270.

Tong, B.Y. et al., "Fluorescence–lifetime measurements in monodispersed suspensions of polystyrene particles," *J. Opt. Soc. Am. B*, Optical Society of America, vol. 10, No. 2, Feb. 1993, pp. 356–359.

Wijekoon, W.M.K.P. et al., "Second–harmonic generation studies of differences in molecular orientation of Langmuir–Blodgett films fabricated by vertical an horizontal dipping techniques," *J. Opt. Soc. Am. B*, Optical Society of America, vol. 10, No. 2, Feb. 1993, pp. 213–221.

Yablanovich, E., "Photonic band–gap structures," *J. Opt. Soc. Am. B*, Optical Society of America, vol. 10, No. 2, Feb. 1993, pp. 283–295.

Zahavi, O. et al., "Study of amplified spontaneous emissions systems by the ray–tracing technique," *J. Opt. Soc. Am. B*, Optical Society of America, vol. 10, No. 2, Feb. 1993, pp. 271–278.

Ziolkowski, R.W. and J.B. Judkins, "Full–wave vector Maxwell equation modeling of the self–focusing of ultrashort optical pulses in a nonlinear Kerr medium exhibiting a finite response time," *J. Opt. Soc. Am. B.*, Optical Society of America, vol. 10, No. 2, Feb. 1993, pp. 186–198.

Translation of Japanese Patent Publication No. 64–80908.

Centini, M. et al., "Highly Efficient Parametric Interactions in One–Dimensional Photonic band Gap Structures"; Operational characteristics and Crystal Growth of Nonlinear Optical Materials; 19–20 Jul. 1999; vol. 3793; pp. 172–178; Proceedings of the SPIE –the Internatioal Society for optical Engineering, 1999.

* cited by examiner

PHOTONIC SIGNAL REFLECTIVITY AND TRANSMISSIVITY CONTROL USING A PHOTONIC BAND GAP STRUCTURE

CROSS-REFERENCE TO RELATED APPLICATIONS

This patent application is related to the following applications:

1. "Photonic Bandgap Apparatus and Method for Delaying Photonic Signals," Ser. No. 08/584,403, by J. Dowling, M. Scalora, M. Bloemer, M. Tocci, C. Bowden, R. Fork, S. Reinhardt, and R. Flynn, filed on Jan. 11, 1996, now pending and incorporated in its entirety herein by reference;
2. "Photonic Signal Frequency Conversion Using a Photonic Band Gap Structure," Ser. No. 09/382,690, by Scalora et al., filed on Aug. 25, 1999, now pending, which is a continuation of International Application PCT/US98/06378, with an international filing date of Apr. 2, 1998, now pending and incorporated in its entirety herein by reference;
3. "Photonic Band Gap Device and Method Using a Periodicity Defect Region to Increase Photonic Signal Delay," Ser. No. 09/250,283, by M. Scalora et al., filed on Feb. 16, 1999, now pending and incorporated in its entirety herein by reference;
4. "Photonic Band Gap Device and Method Using a Periodicity Defect Region Doped with a Gain Medium to Increase Photonic Signal Delay," Ser. No. 60/134,536, by M. Scalora, filed on May 17, 1999, now pending and incorporated in its entirety herein by reference;
5. "Efficient Non-linear Phase Shifting Using a Photonic Band Gap Structure," Ser. No. 60/156,961, by G. D'Aguanno, filed on Sep. 30, 1999, now pending and incorporated in its entirety herein by reference; and
6. "Apparatus and Method for Controlling Optics Propagation Based On a Transparent Metal Stack," Ser. No, 09/471,035, M. Scalora, M. Bloemer, and S. Baglio, filed concurrently herewith, and incorporated in its entirety herein by reference.

FEDERALLY SPONSORED RESEARCH AND DEVELOPMENT

This invention was made with Government support under Contract DAAH01-96-R234 awarded by the U.S. Army Missile Command. The Government has certain rights in the invention.

BACKGROUND OF THE INVENTION

1. Field of the Invention

This invention relates generally to photonic band gap technology.

2. Related Art

In recent years, advances in photonic technology have generated a trend toward the integration of electronic and photonic devices. These devices offer an array of advantages over conventional electronic devices. For example, they can provide enhanced speed of operation and reduced size. In addition, these devices are robust and provide resistance to environmental changes, such as rapid temperature variations, increased lifetime, and the ability to handle high repetition rates. These structures can be made of metals, semiconductor materials, ordinary dielectrics, or any combination of these materials.

In photonic band gap (PBG) structures, electromagnetic field propagation is forbidden for a range of frequencies, and allowed for others. The nearly complete absence of some frequencies in the transmitted spectrum is referred to as a photonic band gap PBG, in analogy to semiconductor band gaps. This phenomenon is based on the interference of light. For frequencies inside the band gap, forward-propagating and backward-propagating signal components can destructively cancel inside the structure, leading to nearly zero transmission and nearly complete reflection.

For example, recent advancements in PBG structures have been made in the development of a photonic band edge non-linear optical limiter and switch. See M. Scalora, et al., Optical Limiting and Switching of Ultrashort Pulses in Non-linear Photonic Band-Gap Materials, *Phys. Rev.* 73, 1368 (1994) (incorporated herein by reference in its entirety). Also, advancements in photonic technology have been achieved with the development of the non-linear optical diode. See M. Scalora et al., The Photonic Band-Edge Optical Diode, *J App. Phys.* 76, 2023 (1994) (incorporated by reference herein in its entirety). In addition, the physical processes involved in the photonic signal delay imparted by a uniform PBG structure are described in detail in Scalora et al., Ultrashort Pulse Propagation at The Photonic Band Edge: Large Tunable Group Delay with Minimal Distortion and Loss, *Phys. Rev. E Rapid Comm.* 54, 1078 (1996) (incorporated by reference herein in its entirety).

There is a need to control the transmissivity and reflectivity properties of a photonic band gap structure to thereby implement efficient, compact, and easily controlled photonic band gap devices, such as a non-linear optical switch or mirror, a non-linear gain medium, and a non-linear optical limiter.

SUMMARY OF THE INVENTION

The present invention provides a new method and device for controlling a non-linear reflectivity and non-linear transmissivity of a photonic pump signal incident on a photonic band gap (PBG) structure using a photonic control signal. The photonic pump and control signals can be continuous or pulsed, as required. Advantageously, the non-linear reflectivity and the non-linear transmissivity of the pump signal can be significantly and controllably increased in relation to the PBG structure relative to when the pump signal is incident on the PBG structure without the control signal. Such dramatic changes in the non-linear reflectivity and transmissivity occur over an advantageously small distance of only a few microns within the PBG structure. Efficient, compact, and easily controlled non-linear optical devices, such as a non-linear optical mirror, a non-linear optical amplifier, and a non-linear optical limiter can thus be realized using the techniques of the present invention.

According to one aspect of the present invention, a method of controlling the non-linear reflectivity of a first photonic signal incident on a PBG structure is provided. The method includes applying a second photonic signal to the PBG structure while the first photonic signal is incident on the PBG structure. The first and second signals interact with each other and with the PBG structure to increase the non-linear reflectivity of the first signal in relation to the PBG structure, relative to when only the first signal is applied to the PBG structure.

According to another aspect of the present invention, a method of controlling a non-linear transmissivity of a first photonic signal incident on a PBG structure is provided. The method includes applying a second photonic signal to the PBG structure while the first photonic signal is incident on the PBG structure. The first and second signals interact with each other and with the PBG structure to increase the non-linear transmissivity of the first signal in relation to the PBG structure, relative to when only the first signal is applied to the PBG structure.

According to yet another aspect of the present invention, a device for controlling the non-linear reflectivity of a first photonic signal incident on the device comprises a PBG structure including a plurality of material layers exhibiting a first order band gap edge and a second order band gap edge. The first order band gap edge is at a relatively low frequency near a frequency of the first photonic signal. The second order band gap is at a relatively high frequency greater than the low frequency of the first order band gap edge. The device further includes a second photonic signal for controlling the non-linear reflectivity of the first photonic signal. While the first photonic signal is incident on the PBG structure, the second photonic signal is applied to and removed from the PBG structure to thereby control the non-linear reflectivity thereof.

According to an even further aspect of the present invention, a device for controlling the non-linear transmissivity of a first photonic signal incident on the device comprises a PBG structure including a plurality of material layers exhibiting a low frequency, first order band gap edge near a frequency of the first photonic signal, and a high frequency, second order band gap edge. The device further includes a second photonic signal for controlling the non-linear transmissivity of the first photonic signal in response to applying the second photonic signal to and removing the second photonic signal from the PBG structure while the first photonic signal is incident on the PBG structure.

Further embodiments, features, and advantages of the present inventions, as well as the structure and operation of the various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is described in terms of this example environment. Description in these terms is provided for convenience only. It is not intended that the invention be limited to application in this example environment. In fact, after reading the following description, it will become apparent to a person skilled in the relevant arts how to implement the invention in other environments.

Terminology

1. Photonic band gap (PBG) structure: a structure wherein electromagnetic field propagation is forbidden for a range of photonic frequencies, and allowed for others. The nearly complete absence of some frequencies in the transmitted spectrum is referred to as a photonic band gap PBG, in analogy to semiconductor band gaps. The PBG structure of the present invention includes a relatively low frequency band gap, corresponding to a fundamental frequency (FF), and a relatively high frequency band gap, corresponding to a second harmonic (SH) frequency. The SH frequency is twice the fundamental frequency.

2. Photonic signal: a light beam external to or within a PBG structure. The terms "photonic signal" (or just "signal"), "beam," and "field" as used herein, are interchageable. The terms "FF signal" and "SH signal" respectively refer to photonic signals at the FF and SH frequencies. In the present invention, a pump beam at the fundamental frequency (that is, an FF beam) and a control beam at the second harmonic beam (that is, an SH beam) are applied to a PBG structure. The SH beam controls the reflectivity and transmissivity of the FF beam in relation to the PBG structure.

1. Non-linear Interaction of Light with Matter

Susceptibility

At a qualitative level, all materials found in nature are non-linear to some degree. Consequently, the characteristic properties of ordinary materials, such as the dielectric susceptibility, change if an applied electromagnetic field intensity is strong enough. The dielectric susceptibility of a material serves as a statement of the index of refraction of the material.

This dependence of a dielectric susceptibility $\chi$ on applied electric field strength can be exemplified in the following way:

$$\chi = \chi^{(1)} + \chi^{(2)}E + \chi^{(3)}E^2 + \ldots \chi^{(j)}E^{j-1} \ldots + \ldots$$

where j is an integer, $\chi^{(1)}$ is a coefficient representing the medium material susceptibility for a low incident field, $\chi^{(j)}$ is the jth non-linear coefficient whose magnitude decreases rapidly as (j) increases, and E is the applied field. Therefore, contributions from the jth term to the dielectric susceptibility $\chi$ become significant if the field strength is gradually increased. Typically, each $\chi^{(j)}$ coefficient can be two to four orders of magnitude greater than each successive $\chi^{(j+1)}$ coefficient, depending on the material. On the other hand, all the coefficients with odd or even (j) greater than one may vanish, depending on the characteristics of the material at the molecular level. For example, all the even coefficients vanish when the molecule has a geometrical center of symmetry, as in a gas.

Because of the non-linear contributions to the dielectric susceptibility, the application of a strong external optical field at frequency ω is capable of generating light at frequency 2ω, 3ω, 4ω, and so on. By the same token, if two strong fields of different frequencies $\omega_1$ and $\omega_2$ are applied to the non-linear material, light at frequencies ($\omega_1+\omega_2$) and ($\omega_1-\omega_2$) (i.e., sum and difference frequencies) can also be generated in addition to the individual harmonics.

The present invention exploits a non-linear interaction between two applied fields of different frequencies, phases, and intensities, to effect changes in, and to control, the transmissivity and reflectivity of one of the applied fields in relation to the non-linear medium.

2. Controlling Transmissivity/Reflectivity

The past two decades have witnessed an intense investigation of electromagnetic wave propagation phenomena at optical frequencies in periodic structures. These structures are usually referred to as PBG crystals. PBG crystals are well known to persons skilled in the relevant arts. Two references describing PBG crystals are Development and Applications of Materials Exhibiting Photonic Band Gaps, edited by C. M. Bowdwen, J. P. Dowling, and H. O. Everitt, special issue of *J Opt. Soc. Am. B* 10,279 (1993); and J. D. Joannopoulos, et al., *Photonic Crystals*, Princeton University Press, Princeton, 1994. These references are incorporated herein by reference in their entirety.

Many practical applications of this new technology have been suggested at least in one dimension, for linear and non-linear systems. Examples of these practical applications include a photonic band edge laser, described in J. P. Dowling et al., *J Appl. Phys.* 75, p.1896 (1994); non-linear optical limiters and diodes, described in M. Scalora et al., *Phys. Rev. Lett.* 73, 1368 (1994); efficient non-linear frequency conversion, described in M. Scalora et al., *Phys. Rev. A.* 56, 3166 (1997) (incorporated herein by reference in its entirety); optical delay lines described in M.

Scalora et al., *Phys. Rev. E* 54, 1078 (1996); and transparent metals described in M. J. Bloemer et al., *Appl. Phys. Lett.* 72, 1676 (1998). These devices are based on the physics of the photonic band edge where a fundamental enhancement of the electromagnetic density of modes (DOM), field localization, group velocity reduction, and the availability of exact phase matching conditions make these devices extremely promising for both linear and non-linear optical applications, as described in the following publications: M. J. Bloemer et al.,*Appl. Phys. Lett.* 72, 1676 (1998); M.Centini et al., *Phys. Rev E* 56, p. 4891 (1999) (incorporated herein by reference in its entirety); and G. D'Aguanno et al., In press on *Opt. Lett* (15 Nov. 1999). See, also, "Photonic Bandgap Apparatus and Method for Delaying Photonic Signals," Ser. No.08/584,403, by J. Dowling, M. Scalora, M. Bloemer, M. Tocci, C. Bowden, R. Fork, S. Reinhardt, and R. Flynn, filed on Jan. 11, 1996; "Photonic Signal Frequency Conversion Using a Photonic Band Gap Structure," Ser. No. 09/382,690, by Scalora et al., filed on Aug. 25, 1999, now pending, which is a continuation of International Application PCT/US98/06378, with an international filing date of Apr. 2, 1998, now pending; "Photonic Band Gap Device and Method Using a Periodicity Defect Region to Increase Photonic Signal Delay," Ser. No. 09/250, 283, by M. Scalora et al., filed on Feb. 16, 1999, now pending; "Photonic Band Gap Device and Method Using a Periodicity Defect Region Doped with a Gain Medium to Increase Photonic Signal Delay," Ser. No. 60/134,536, by M. Scalora, filed on May 17, 1999, now pending; and "Efficient Non-linear Phase Shifting Using a Photonic Band Gap Structure," Ser. No. 60/156,961, by G. D'Aguanno, filed on Sep. 30, 1999, now pending; "Apparatus and Method for Controlling Optics Propagation Based On a Transparent Metal Stack," Ser. No. 09/471,035 filed on Dec. 23, 1999, M. Scalora, M. Bloemer, and S. Baglio.

The present invention utilizes yet another effect that can occur near the band edge. Namely, the present invention utilizes the modification of the reflective and transmissive properties of a one-dimensional (1-D) PBG structure doped with a $\chi^{(2)}$ material, as photonic pulses at the fundamental frequency (FF) and second harmonic (SH) frequency interact under suitable phase matching conditions near the band edge. The photonic pulses at the FF and SH frequencies can be supplied to the PBG structure from respective external pulse sources.

In accordance with one embodiment of the present invention, a predetermined phase matching condition between the FF and SH photonic signal pulses (also referred to as the FF and SH fields, respectively) in a regime of undepleted SH intensity results in an increase in a non-linear gain at the band edge, which leads to a dramatic reflectivity (and transmissivity) change of the FF field over a distance of only a few microns. The threshold intensity of the SH pulse, which acts as a control pulse in the present invention, is on the order of 1 gigawatt (GW)/centimeter$^2$(cm$^2$), and $\chi^{(2)}$ is in the range of 20–30 picometer (pm)/Volt (V). Generally the threshold intensity can be reduced by several orders of magnitude by an increase in the density of modes (DOM) (See, e.g., G. D'Aguanno et al., In press on *Opt. Lett* (Nov.15, 1999)). The effect, described herein, is related to the enhancement of gain near the band edge (See, e.g., J. P. Dowling et al., *J. Appl. Phys.* 75, p. 1896 (1994)) and a SH amplification process that occurs near the band edge in a phase matched, 1-D PBG structure. A "deamplification" regime is also utilized in the present invention, which leads to non-linear optical limiter behavior.

In the following paragraphs, a structure and device arrangement according to a preferred embodiment is described. Next, a formal analysis is provided to quantitatively describe the performance of the present invention.

3. PBG Structure and Characteristics

PBG structures inhibit propagation for a range of frequencies about some reference frequency. Such frequency ranges are known as photonic band gaps. PBG structures allow propagation for other frequency ranges that are away from band gaps.

Figure 1A:
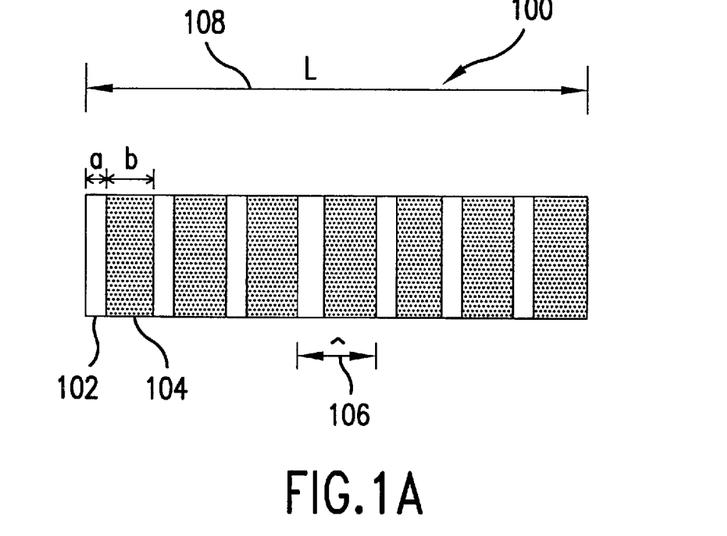
FIG. 1A is a diagram of a preferred embodiment of a one-dimensional, finite, N-period photonic band gap structure comprising pairs of alternating layers of high and low linear refractive index, according to the present invention.

FIG. 1A is an illustration of a PBG structure 100 according to a preferred embodiment of the present invention. In one dimension, photonic band gap structure 100 comprises a plurality of layers alternating between a low and a high index of refraction. PBG structure 100 comprises a stack of alternating layers 102 and 104 of refractive materials having predetermined indices of refraction $n_1$, and $n_2$, and predetermined thicknesses, a and b, respectively. Alternating layers 102 and 104 may also have different $\chi^{(2)}$ responses. PBG structure 100 has a period 106 that is defined by the length of two adjacent alternating layers 102 and 104, referred to as a stack. The magnitude of period 106 is represented by the symbol Λ, where Λ=a+b. PBG structure 100 comprises N periods, and has a total length 108 represented by the symbol L, where L=NΛ, and N is an integer greater than zero.

In the preferred embodiment, thicknesses a and b are a fraction of a wavelength ($\lambda$) of a photonic signal incident on PBG structure 100. Specifically, thickness a of layer 102 is determined according to the equation $a=\lambda/(4n_1)$, and thickness b of layer 104 is determined according to the equation $b=\lambda/(2n_2)$. The resulting PBG structure is referred to as a mixed half-quarter wave structure.

In an alternate embodiment, a PBG structure comprises layers of varying thickness and indices of refraction. As long as the structure produces a photonic band gap transmission profile, this layering may be periodic, quasi-periodic, non-periodic, or random in thickness and/or index of refraction.

PBG structures according to the present invention may also based on metallic PBG structures. As set forth above, PBG devices may comprise a plurality of alternating material layers. In an alternate embodiment, the first material component is a transition metal. This metal can be gold, silver, copper, aluminum, tungsten, bismuth, or in general a good conductor of electricity with properties similar to those of gold, silver, copper, etc. The second material component is a dielectric or semiconductor material. For example, glasses such as quartz or magnesium fluoride ($MgF_2$) can be used, and semiconductors such as gallium arsenide, aluminum arsenide, or germanium can also be used. Further, any alloy or other material that can be combined with a metallic substance can also be engineered and used for this purpose. This combination of materials results in a new index of refraction and new absorption characteristics for the PBG structure. These properties can depend on the respective proportions of the materials used in the structure. It should be noted, however, that similar structures that use different metals can respond to the same photonic signal in very different ways. Also, the ordering of the metal/dielectric structure can be interchanged to a dielectric/metal structure without affecting the transmissive properties of the PBG structure.

As an example to illustrate the alternate embodiment described in the above paragraph and its operation, a transparent metal PBG structure can be fabricated with the component layers of silver (Ag), a metal, and magnesium fluoride ($MgF_2$), a glass. Here, the total amount of Ag in the transparent metal PBG device can be hundreds of skin depths in thickness. Similarly, the thickness of the $MgF_2$ layers can also vary.

In particular, the transparent metal shielding device is a PBG structure comprising several alternating $Ag/MgF_2$ layers deposited on a glass, or any other suitable substrate. For some applications, it can be desirable that the transmitted range of frequencies not be in the visible range. Thus, the substrate can be opaque to visible light. For example, semiconductor substrates such as aluminum arsenide (AlAs) and gallium arsenide (GaAs) can also be used as a substrate, depending on what transmission window is desired.

Figure 1B:
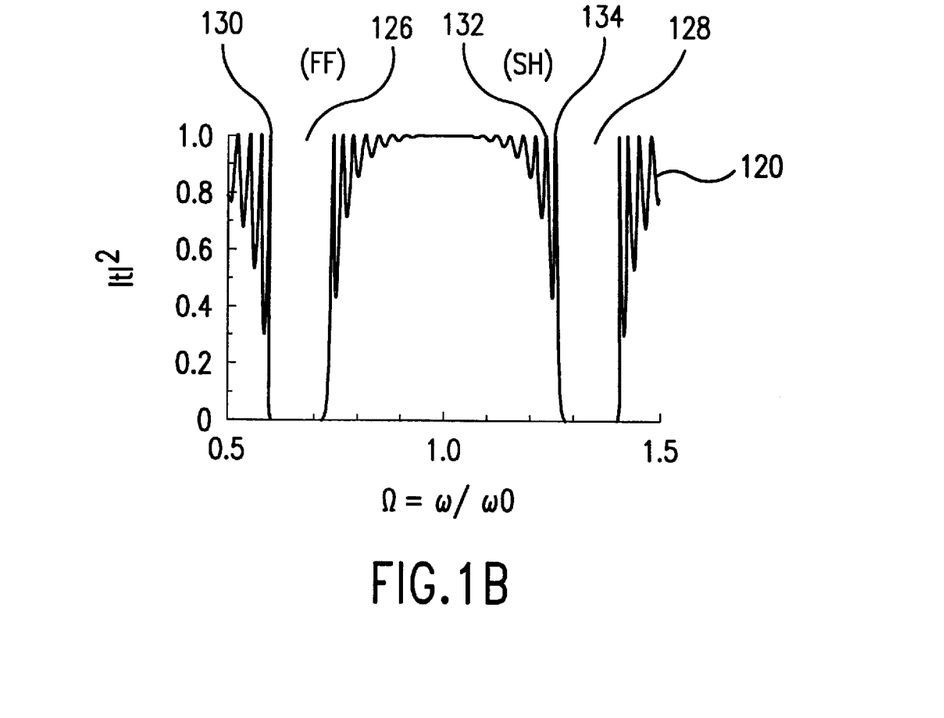
FIG. 1B is a characteristic transmission profile for an exemplary PBG structure according to the present invention.

FIG. 1B is a representative optical transmission profile 120 corresponding to an exemplary photonic band gap structure, similar to band gap structure 100. The exemplary photonic band gap structure includes N=20 periodic half-quarter wave stacks, wherein layer 102 has thickness $a=\lambda/(4n_1)$ and refractive index $n_1=1$, and layer 104 has thickness $b=\lambda/(2 n_2)$ and refractive index $n_2=1.429579$. Layers 102 and 104 have equal $\chi^{(2)}$ responses. A little dispersion has been introduced as described in M. Scalora et al., *Phys. Rev. Lett.* 73, 1368 (1994). Transmission profile 120 is obtained by plotting the optical transmission $|t^2|$ as a function of a normalized frequency $\Omega$, where $\Omega=\omega/\omega_0$. $\omega_0$ is a reference frequency used to create a normalized frequency scaling. The maximum possible transmission is 1.0.

Transmission profile 120 includes a low frequency, first order band gap 126 and a high frequency, second order band gap 128. A typical PBG structure exhibits an infinite number of photonic band gaps and band edges that are adjacent to the band gaps. Therefore, it is the absence of those frequencies from the transmitted spectrum that gives rise to the name "band gap", in analogy to the electronic band gap of semiconductors where electrons having a specific range of energies cannot propagate inside a semiconductor crystal.

At frequencies outside the photonic band gap, the properties of the structures are such that a series of transmission resonances are obtained. These peaks are also referred to as peaks of transmittance. The number of such resonances is equal to the number of periods that make up the structure. The bandwidth of said resonances is a sensitive function. For a particular PBG structure, this function depends on the total number of periods, and each layer's refractive index.

Profile 120 includes a low frequency band edge 130 of first order band gap 126, and a second resonance peak 132 near a low frequency band gap edge 134 of second order band gap 128. Low frequency band edge 130 and second resonance peak 132 respectively represent the fundamental frequency FF and the second harmonic resonance frequency SH for which phase matched second harmonic interactions occur.

Figure 1C:
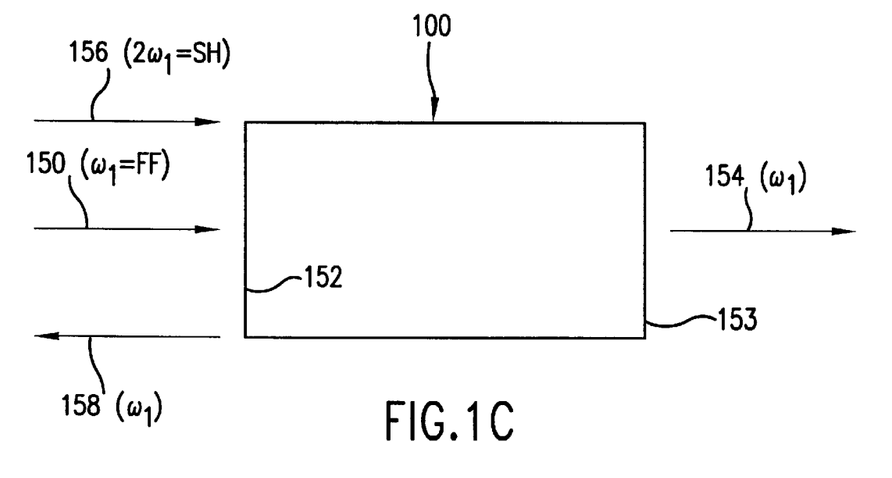
FIG. 1C is an embodiment of an arrangement for controlling a non-linear transmissivity and a non-linear reflectivity of a photonic signal using the PBG structure of FIG. 1A, according to the present invention.

FIG. 1C is an illustration of an arrangement for controlling the transmissivity and reflectivity of a first photonic signal 150 using PBG structure 100. First photonic signal or beam 150 is referred to as a pump beam and has a frequency $\omega_1$ corresponding to the fundamental frequency FF. First beam 150 is applied to an interface 152 of structure 100 from an external source (not shown). In the absence of any other photonic signals, first signal 150 undergoes minimal reflection (i.e., near 0% reflection) at interface 152 and passes through PBG structure 100 with only slight attenuation. First signal 150 thus emerges from an interface 153 (opposite interface 152) of PBG structure 100 as an exit signal or beam 154 having substantially the same energy level as first signal 150.

In accordance with the present invention, the transmissivity and reflectivity of first beam 150 in relation to PBG structure 100 is controlled by applying a second photonic signal or beam 156 to interface 152 under one or more of the following predetermined conditions:

1) selecting a frequency $2\omega_1$ for second beam 156 such that beam 156 has a frequency aligned with the second harmonic resonance frequency SH;

2) establishing a predetermined phase difference between beams 150 and 156, such as $-\pi/2$ radians; and 3) setting an intensity level of second beam 156 at a level that is at least an order of magnitude greater than an intensity level of first beam 150. For example, the amplitude at $2\omega_1$ (i.e., of second beam 156) is $10^8$ V/m, while the amplitude at $\omega_1$ (i.e., of first beam 150) is $10^4$ V/m.

Under the above predetermined conditions, the interaction between applied beams 150 and 156, and between the beams and the layers of PBG structure 100, permits control over the reflectivity and transmissivity of the applied beams in relation to the PBG structure.

For example, assuming incidence of only one of the beams (either beam 150 or 156) on the PBG structure at any given time, then as mentioned above, substantially 100% of the energy in the one beam is transmitted by the PBG structure, and virtually no reflection results. In contrast to this situation, if both beams 150 and 156 are incident on the structure at the same time, a non-linear interaction results between the two beams causing energy to be transferred from one beam to the other and reflection of beam 150 results. Specifically, the relative phases of input beams 150 and 156 are chosen in combination with the phase matching conditions of the PBG structure to yield an efficient energy transfer from beam 156 to beam 150. Under such conditions, the remarkable results of the interaction realize the following PBG device applications:

(a) A Non-linear Optical Switch or Mirror (i) Reflection

If both beams 150 and 156 are applied to PBG structure 100 and interact non-linearly as they propagate, then beam 150 experiences non-linear gain in a reverse or backward propagating direction which increases the minimal reflection of the beam from 0% (described above) to more than 100%. In FIG. 1C, reflected energy is represented by a reflected beam 158. Reflected beam 158 is in the "off" state while only beam 150 is incident on the structure because beam 150 undergoes minimal reflection. In contrast to this situation, reflected beam 158 is in the "on" state while both beams 150 and 156 are applied to PBG structure 100 because beam 150 undergoes substantial reflection if the predetermined conditions are met. The reflected energy of beam 158 can be larger than 100% (i.e., greater than the energy of beam 150 as applied to PBG structure 100) because a substantial amount of energy is transferred, within PBG structure 100, from beam 156 to beam 150 and reflected beam 158. These interactions occur over a distance of only a few microns within PBG structure 100 (i.e., from interface 152).

(ii) Transmission

Beam 150 also experiences significant non-linear gain within PBG structure 100 in a forward propagating or transmit direction under the same conditions that cause the non-linear amplification in the reverse propagating direction, as described above. While only beam 150 is incident on PBG structure 100, most (i.e., nearly 100%) of the energy in beam 150 is transmitted through structure 100 to exit beam 154. In contrast, while both beams 150 and 156 are applied to PBG structure 100 and thereby interact non-linearly with each other and with PBG structure 100 as they propagate within the structure, the energy in exit beam 154 can be increased from 100% to as much as 1000% of the energy in incident beam 150. Energies greater than 100% are again attributed to a transfer of energy from beam 156 to beam 150 within PBG structure 100.

In the case of transmission, 100% transmission represents an "off" state while 1000% transmission represents an "on" state, for example. The difference between intensities at 100% and 1000% transmission represents a sufficient, i.e., detectable, contrast between the on and off states of exit beam 154.

(b) An Efficient Non-linear Gain Medium

An efficient non-linear gain medium is realized when one of the applied beams 150 or 156 transfers energy efficiently to the other applied beam. This makes possible applications wherein if a beam propagates over long distances, as in a fiber under the ocean, for example, then the non-linear gain process can be utilized to regenerate beam 150 under conditions of transmission or reflection. For example, in the case of fibers, a plurality of fiber gratings, each including a PBG structure in accordance with the present invention, are fabricated within the fiber at spaced intervals, such that at each fiber grating, the phase matching conditions are satisfied for effecting an efficient energy conversion from beam 156 to beam 150. Then, if the information carrying signal (e.g., beam 150) loses energy or is depleted, the periodic injection of beam 156 into the fiber gratings causes beam 150 to regenerate without requiring electrical, underwater amplifiers.

(c) An Optical Limiter

Since the operation of the described device depends on the relative phases of applied beams 150 and 156, the beam phases can be chosen to either maximize or minimize the signal transmission. In one example implementation of the present invention maximizing signal transmission, a phase difference between beams 150 and 156 is $-\pi/2$ radians. In another example implementation minimizing signal transmission, the phase difference is $-3\pi/2$ radians. This phase dependent effect is discussed below. Such behavior is important because no band shifts are required, which means the effect can be easily observed.

(d) Non-optical Beams

The present invention can be extended to all frequencies of the electromagnetic spectrum, including but not limited to radio waves and radiation at tetra frequencies (also called T-frequencies or frequencies on the order of $10^{12}$ Hz), which would require the utilization of different materials.

4. Formal Analysis

The paragraphs below provide an extensive summary of the theory behind the present invention as well as a description of an example device according the present invention. This description is illustrative and not intended to limit the present invention.

According to the present invention, an analytical/numerical model can be utilized to allow one of ordinary skill in the art to design PBG structure 100 to obtain desired non-linear interactions that govern the transmissivity and reflectivity properties of the PBG medium for a particular application. The model includes a one-dimensional, finite, N-period structure consisting of pairs of alternating layers of high and low linear refractive indices, and possibly different $\chi^{(2)}$ response.

The geometry of the model fulfills phase matching conditions where the fundamental field $\omega_1$ is tuned at the low frequency band edge and the second harmonic $2\omega_1$, is tuned at the second resonance with respect to the second order band gap, as depicted in FIG. 1B. This can be obtained for a mixed half-quarter wave periodic PBG structure.

It is assumed that the two signal pulses (i.e., beams 150 and 156) applied to the PBG structure are tuned at frequencies $\omega_1$ and $2\omega_1$ and propagate in the presence of large index discontinuities. It is further assumed that the two incident pulses are nearly monochromatic. This implies that the bandwidth of each pulse is much narrower than the bandwidth of the band edge transmission resonance, where pulses are tuned. Under the foregoing assumptions, the equations of motion for each of the signal pulses 150, 156 can be cast in the following form:

$$d^2 E_{\omega_1}(z)/dz^2 + \frac{\omega_1^2}{c^2}\tilde{N}^2(z,\omega_1)E_{\omega_1}(z) = 0 \quad (1.a)$$

$$d^2 E_{2\omega_1}(z)/dz^2 + \frac{4\omega_1^2}{c^2}\tilde{N}^2(z,2\omega_1)E_{2\omega_1}(z) = 0$$

where $$\tilde{N}^2(z,\omega_1) = n^2(z,\omega_1) + 8\pi\chi^{(2)}(z)\frac{E^*_{\omega_1}(z)E_{2\omega_1}(z)}{E_{\omega_1}(z)} \quad (1.b)$$

$$\tilde{N}^2(z,2\omega_1) = n^2(z,2\omega_1) + 4\pi\chi^{(2)}(z)\frac{E^2_{\omega_1}(z)}{E_{2\omega_1}(z)}$$

Here, $E_{\omega_1}$ and $E_{2\omega_1}$ are field eigenmodes at the frequencies $\omega_1$ and $2\omega_1$, respectively;

n(z,ω) is the linear refractive index of the layered structure; and $\tilde{N}(z,\omega_1)$ and $\tilde{N}(z,2\omega_1)$ represent complex, non-linear refractive indices at the frequencies $\omega_1$ and $2\omega_1$.

$N(z\omega)$ thus plays the role of total refractive index, which includes a linear and a non-linear part. For large index contrast, typically of order unity, the non-linear contribution remains a weak perturbation even in the depleted pump regime. Therefore, for realistic $\chi^{(2)}$ values and field amplitudes, there is expected a non-linear contribution several orders of magnitude smaller compared to the linear refractive index contrast. As a consequence, shifts of the band edge, which are proportional to the non-linear index change, are negligible compared to resonance bandwidth. Under these circumstances, eqs.(1.b) can be expanded as follows:

$$\tilde{N}(z,\omega_1) = n(z,\omega_1) + \frac{4\pi\chi^{(2)}(z)}{n(z,\omega_1)}|E_{2\omega_1}(z)|e^{i(\varphi(z)-2i\phi(z))} \quad (2)$$

$$\tilde{N}(z,2\omega_1) = n(z,2\omega_1) + \frac{2\pi\chi^{(2)}(z)|E_{\omega_1}(z)|^2}{n(z,2\omega_1)}e^{i(\varphi(z)-2i\phi(z))}$$

where $$E_{\omega_1}(z)=|E_{\omega_1}(z)|\cdot e^{i\phi(z)}; E_{2\omega_1}(z) =|E_{2\omega_1}(z)|\cdot e^{i\varphi(z)}.$$

are the field eigenmodes at the frequencies $\omega_1$ and $2\omega_1$, respectively. The eigenmodes are obtained with a simple application of the matrix transfer method described in M. Scalora et al., *Phys. Rev. A.* 56, 3166 (1997), and M. Centini et al., *Phys. Rev E* 56, p. 4891 (1999). It is observed that the non-linear refractive index is different from zero if the field at the SH frequency is not zero. Further, the refractive index $\tilde{N}(z,\omega)=n(\omega)+\Delta n(z,\omega)$ is a complex quantity that depends on the relative phases of the fields.

In order to obtain gain at the FF frequency the following input condition are imposed on the relative phases between FF and SH fields: $\phi(2\omega)-2\phi(\omega)=-\pi/2$. Therefore, the complex refractive index $\tilde{N}(z,\omega_1)$ at the fundamental frequency can be estimated easily and to a very good approximation, assuming that 1) the SH field is orders of magnitude more intense than the FF, 2) the SH field remains essentially undepleted during the interaction, and 3) shifts of the band edge can be neglected due to the relatively small non-linear index change compared to linear index contrast. In particular, the real and imaginary parts of $\Delta n(z,\omega_1)$ can be evaluated once the linear field eigenmodes are known.

Figure 2A:
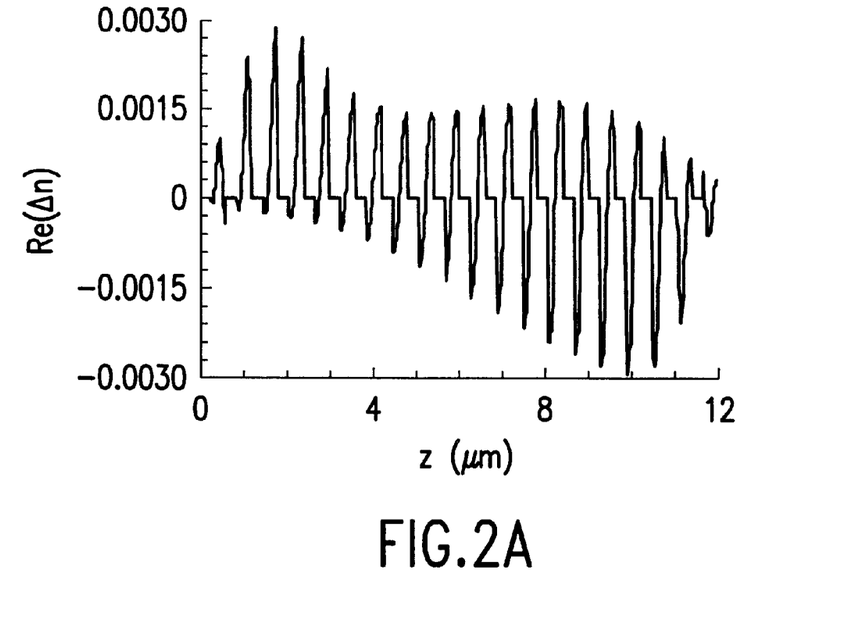
FIG. 2A is a plot of a real part of a non-linear refractive index perturbation $\Delta n(z, \omega_1)$ vs. a total length of the exemplary PBG structure described in connection with FIG. 1B.
Figure 2B:
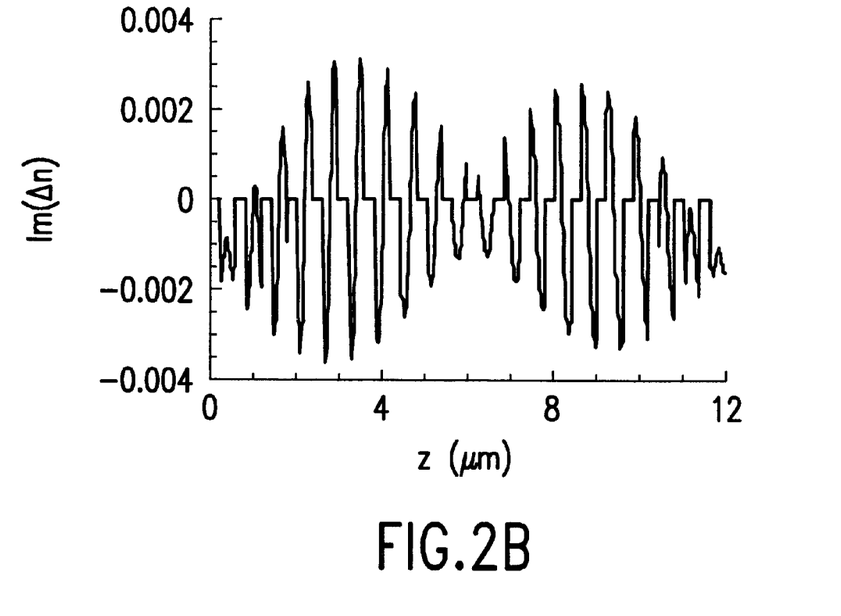
FIG. 2B is a plot of an imaginary part of $\Delta n(z,\omega_1)$ vs. the total length of the exemplary PBG structure described in connection with FIG. 1B.

Exemplary behavior of the non-linear index $\leftarrow n(z,\omega_1)$ is plotted in FIGS. 2A and 2B. In FIG. 2A, the real part $Re(\Delta n)$ of $\Delta n(z,\omega_1)$ is plotted as a function of position z inside the PBG structure, while the imaginary part $Im(\Delta n)$, which represents gain (or loss), is plotted in FIG. 2B. The plots of FIGS. 2A and 2B are based on an exemplary PBG structure having mixed half-quarter wave stacks with N=20, and with alternating layer thicknesses having refractive indices $n_1=1$ and $n_2=1.4285$, respectively. The frequency of the fundamental or pump field FF is tuned to the low frequency band edge and the frequency of the second harmonic field SH is tuned to the second resonance of the second order band edge. The amplitudes of the SH and FF fields are chosen to be on the order of $10^8$ V/m and $10^4$ V/m, respectively. Also, $\chi^{(2)}=25$ pm/V, which is typical for semiconductor materials. From FIGS. 2A and 2B, it is observed that the maximum value of $\Delta n(z,\omega_1)$ is more than two orders of magnitude smaller than the linear refractive index difference between alternating layers.

Once the perturbation $\Delta n(z,\omega_1)$ has been calculated, the matrix transfer method —appropriately modified to contain the new spatial modulation of the index —is applied to calculate the modified, non-linear transmission spectrum. The procedure is repeated for all of the frequencies contained in the pulse at the fundamental frequency, again assuming that shifts of the band edge are negligible and pulse bandwidth is well contained under the band edge transmission resonance. This allows the same eigenmode to be used for all of the frequencies contained in the pulse.

The regime of validity of this approximation has been tested and verified by direct integration of the equations of motion in the time domain in a manner similar to the method developed in M. Scalora et al., *Phys. Rev. A.* 56, 3166 (1997). Using an FFT beam propagation method described in M. Scalora et al., *Phys. Rev. A.* 56, 3166 (1997), which assumes slowly varying amplitudes in time (SVEAT) only, there is good agreement with the results presented herein. In fact, the direct integration of the wave equation also reveals that shifts of the band edge remain negligible even in the depleted pump regime.

The influence of the density of modes at the band edge for this amplification scheme is now analyzed, keeping in mind that the field is strongly localized at the band edge as a result of the high density of modes. This leads to low group velocities, and a maximum value of the moduli of the field eigenvalues. States that display relatively modest but significant amplification of the fundamental field at the band edge in both forward and backward directions are easily accessed, with a gain coefficient proportional to $N^2$ (where N is the number of periods) (See, e.g., J. P. Dowling et al., *J Appl. Phys.* 75, p. 1896 (1994), M. Scalora et al., *Phys. Rev. A.* 56, 3166 (1997), and J. Bendickson et al, *Phys. Rev. E.* 53, p. 4107 (1996)) and the refractive index contrast.

Figure 3:
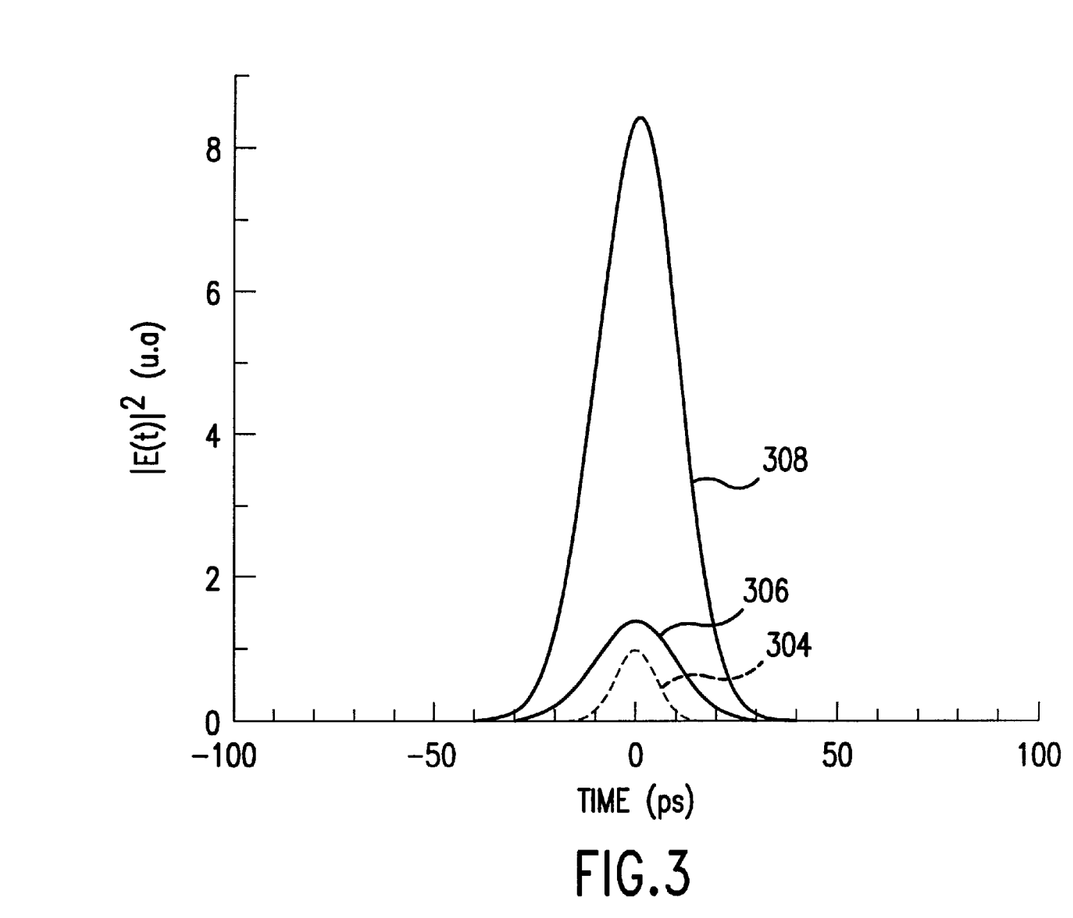
FIG. 3 is a plot of pulsed photonic signal transmissivity vs. pulse duration for PBG structures having different numbers of periods (N), in an amplification regime, according to the present invention.

FIG. 3 is a plot of photonic pulse transmissivity $|E(t)|^2$ at the fundamental frequency FF vs. pulse duration (in picoseconds), for different numbers of periods N, under the amplification regime (i.e., wherein $\phi_{2\omega}(z=0)-2\phi_\omega(z=0)=-\pi/2$). Linear transmission is plotted as a dashed curve 304. A plot 306 represents a non-linear transmission for N=20 periods, while a plot 308 represents non-linear transmission for N=35 periods. The plots of FIG. 3 are based on the exemplary PBG structure used in connection with FIGS. 1A and 1B.

An increase in the number of periods N induces an increase in the transmitted pulse intensity, as a result of the large increase of the density of modes (See, e.g., J. Bendickson et al, *Phys. Rev. E* 53, p. 4107 (1996)). Thus, the amplitude of the transmitted and reflected components of the FF field are easily calculated using the above described numerical method, with a suitable selection of relevant parameters, such as the number of periods N, the magnitude of $\chi^{(2)}$, and the input intensity of the SH field. It is found that the non-linear interaction leads to non-linear mirror or optical switch behavior in that a state of complete transmission can be modified to a state where both transmission and reflection display amplification. Neglecting for the moment the amplification in the forward direction, this device effectively operates as a non-linear mirror, much more efficiently than can the geometry discussed in J. Martorell et al., *Opt. Comm.* 144, 65 (1997), and C. Cojocaru et al., *Appl. Phys. Lett.* 74, p. 504 (1999).

Figure 4A:
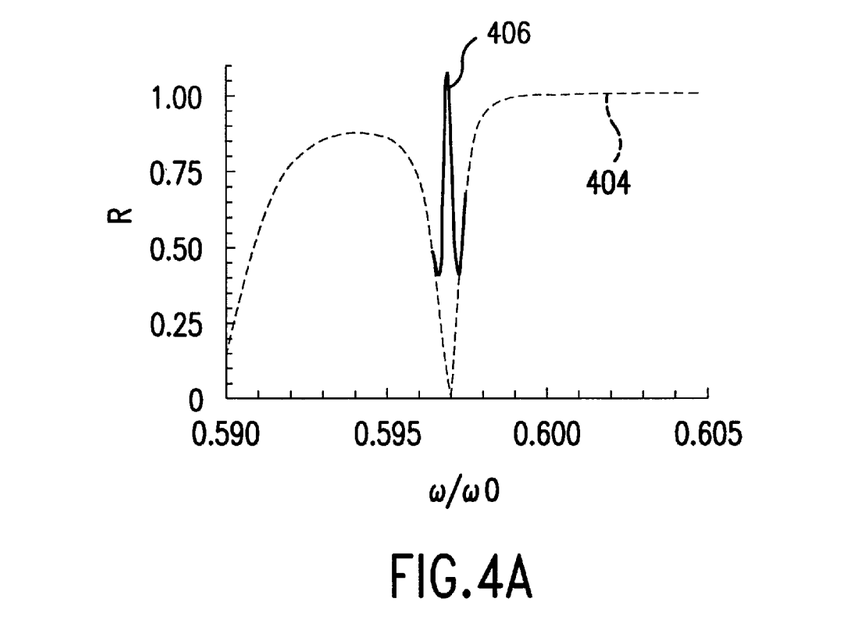
FIG. 4A is a plot of pulsed photonic signal reflectivity vs. normalized frequency, in an amplification regime, according to the present invention.
Figure 4B:
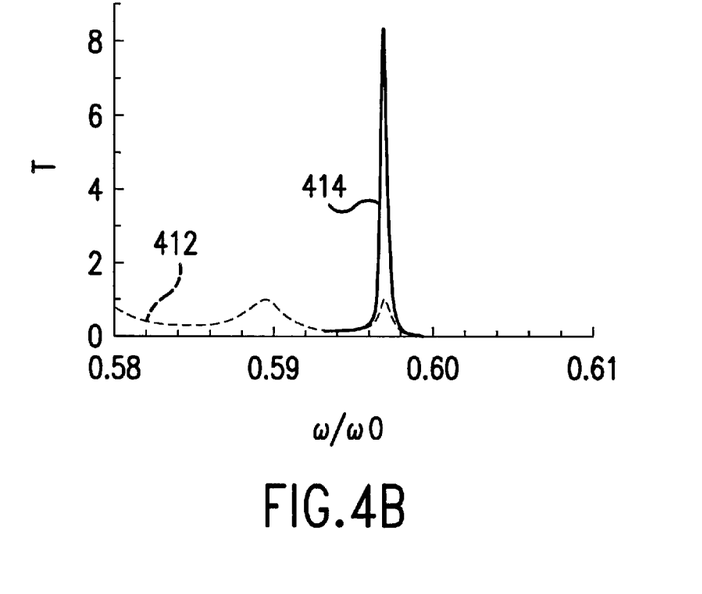
FIG. 4B is a plot of pulsed photonic signal transmissivity vs. normalized frequency, in an amplification regime, according to the present invention.

FIGS. 4A and 4B are plots obtained using the procedure described above. FIG.4A is an exemplary plot of FF field reflectivity R vs. normalized frequency $\omega/\omega_0$ under the amplification regime, wherein linear reflectivity is plotted as a dashed curve 404, and a plot 406 represents non-linear reflectivity. On the other hand, FIG. 4B is an exemplary plot of FF transmissivity vs. normalized frequency, wherein linear transmissivity is plotted as a dashed curve 412, and a plot 414 represents non-linear transmissivity.

The example PBG geometry comprises 35 periods of a mixed half-quarter wave stack, with refractive indices of $n_1(\omega_1)=1$ and $n_2(\omega_1)=1.42857$; some dispersion is introduced in the refractive indices, such that $n_1(2\omega)=1$, and $n_2(2\omega)=1.524$. Also, $\omega/\omega_0=0.597$, where $\omega_0=29.1$ $\mu$m so that the conditions described in M. Scalora et al., *Phys. Rev. A*. 56, 3166 (1997), and M. Centini et al., *Phys. Rev E* 56, p. 4891 (1999) are reproduced. The FF beam is tuned to the first transmission resonance near the first order band edge, and has an amplitude of approximately $10^4$ V/m. The SH beam is tuned to the second resonance peak near the second order band edge, and has an amplitude of approximately $10^8$ V/m. The $\chi^{(2)}$ is chosen to be approximately 20 pm/V. The FF and SH beams are both pulsed photonic signals, each having a duration of approximately 10 ps. Also, the input phase difference between the SH and FF pulsed beams is $-\pi/2$.

Referring again to FIG. 1C, and in light of the foregoing description and analysis, PBG structure 100 can be regarded as a kind of photonic beam generator for concurrently generating both an amplified forward propagating or transmitted beam (for example, beam 154) and an amplified reverse propagating or reflected beam (for example, beam 158). PBG structure 100 behaves as a beam generator because within PBG structure 100

(a) energy transferred from the SH field to the FF field increases, that is, non-linearly amplifies, the FF field; and (b) amplified FF field energy is launched in both the forward propagating and reverse propagating directions to thereby respectively emerge from opposing interfaces faces 152 and 153 of PBG structure 100 as transmitted and reflected beams 154 and 158, respectively, as depicted in FIG. 1.

Figure 5:
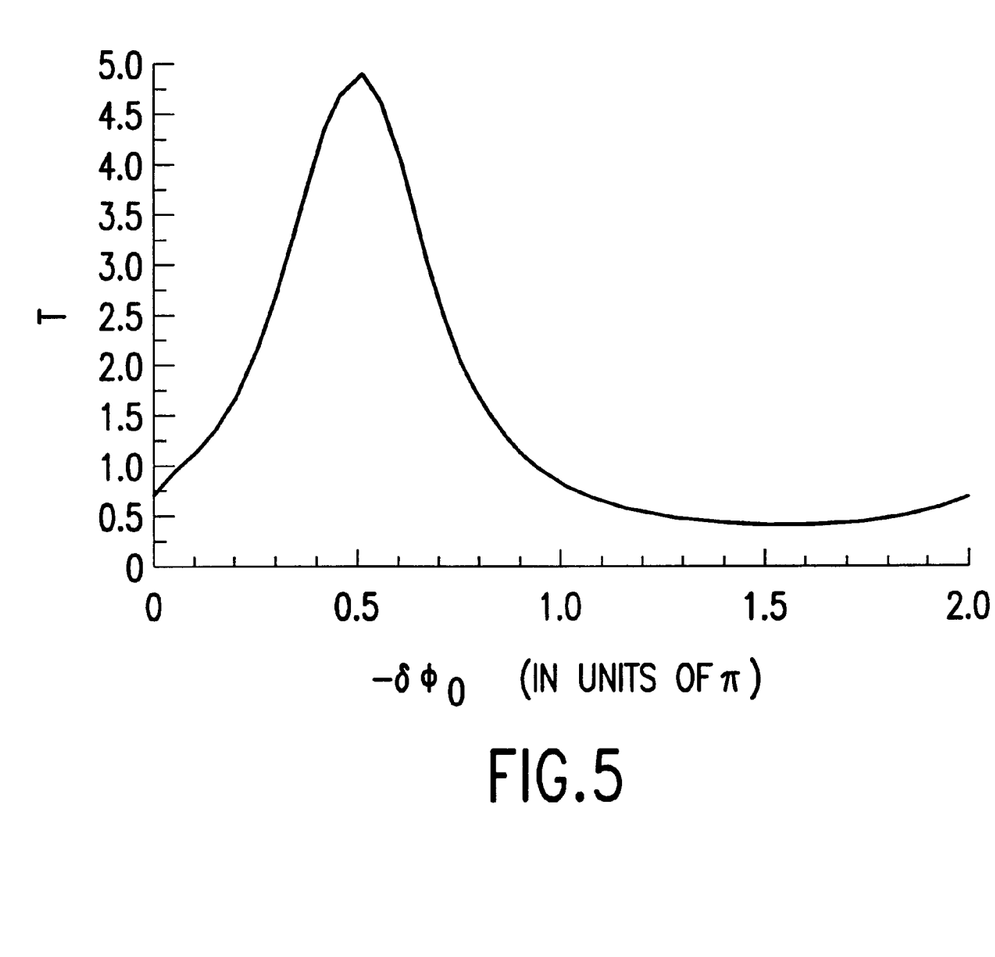
FIG. 5 is a plot of the transmissivity of a photonic signal at a fundamental frequency vs. the relative phase difference between the photonic signal at the fundamental frequency and a photonic signal at a second harmonic frequency, according to the present invention.

The non-linear mirror and non-linear transmitter behaviors described above are a sensitive function of the relative input phases of the FF and SH beams, as exemplified by the plot of FIG. 5. FIG. 5 is a plot of FF transmissivity T vs. the phase difference $\delta\phi$ between the FF and SH fields. The transmissivity plot of FIG. 5 is based on the PBG parameters used in connection with FIG. 3.

FIG. 5 suggests that the transmission is a periodic function of $\delta\phi$, as expected. However, this effect can also be viewed as a kind of optical limiting and switching behavior which can be controlled via the adjustment of $\delta\phi$. It should be noted that an "input" dependent "de-amplification" process occurs for a relative input phase difference of $-3\pi/2$. The transmissivity can be decreased with respect to the linear transmission thus leading to a novel type of optical limiter; one using a second order effect and not requiring any spectral shifts.

In conclusion, group velocity reduction near the band edge gives rise to a non-linear amplification scheme induced by the coupling between the FF and the SH fields. The high density of modes and the particular phase matching conditions accessible near the photonic band edge makes possible PBG structures that provide efficient, phase sensitive non-linear mirrors and optical limiting elements according to the present invention. It is further stressed that although periodic structures and simple second order processes have been analyzed herein, the same effects are predicted for structures that are not necessarily periodic or one-dimensional, or that contain metals, and for other types of non-linear processes, such as $\chi^{(3)}$ for third harmonic generation or Raman processes.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all articles and patent documents mentioned above are incorporated by reference herein.

What is claimed is:

1. A method of controlling a non-linear reflectivity of a first photonic signal incident on a photonic band gap (PBG) structure, comprising the step of:

applying a second photonic signal to the PBG structure while the first photonic signal is incident on the PBG structure, wherein the first and second photonic signals exchange energy with each other and with the PBG structure to substantially increase the non-linear reflectivity of the first photonic signal in relation to the PBG structure relative to when only the first photonic signal is applied to the PBG structure.

2. The method of claim 1, further comprising the step of removing the second photonic signal from the PBG structure while the first photonic signal is incident on the structure to minimize the non-linear reflectivity of the first photonic signal.

3. The method of claim 1, further comprising the steps of applying a first photonic signal having a first frequency tuned near a relatively low frequency, first order band gap edge of the PBG structure to the PBG structure, and applying a second photonic signal having a second frequency tuned near a relatively high frequency, second order band gap edge of the PBG structure to the PBG structure.

4. The method of claim 3, wherein the step of applying the second photonic signal includes the step of applying a second photonic signal having a second frequency that is twice the first frequency.

5. The method of claim 3, further comprising the step of transferring a portion of energy from the second photonic signal to the first photonic signal within the PBG structure.

6. The method of claim 5, further comprising the step of non-linearly amplifying a reverse-propagating photonic signal at the first frequency within the PBG structure to increase the non-linear reflectivity of the first signal.

7. The method of claim 5, further comprising the step of setting an intensity of the second photonic signal at a level that is at least an order of magnitude higher than an intensity level of the first photonic signal.

8. The method of claim 7, further comprising the step of pulsing the first and second photonic signals applied to the PBG structure.

9. The method of claim 1, further comprising the step of imposing a phase difference of $-\pi/2$ radians between the first and second photonic signals to maximize the increase in the non-linear reflectivity of the first photonic signal.

10. The method of claim 1, wherein the first and second photonic signals exchange energy with each other and with the PBG structure based on a non-linear $\chi^{(2)}$ response of the PBG structure.

11. A method of controlling a non-linear transmissivity of a first photonic signal incident on a PBG structure, comprising the step of:

applying a second photonic signal to the PBG structure, wherein the first and second photonic signals exchange energy with each other and with the PBG structure, thereby substantially increasing the non-linear transmissivity of the first photonic signal in relation to the PBG structure relative to when only the first photonic signal is applied to the PBG structure.

12. The method of claim 11, further comprising the step of removing the second photonic signal from the PBG structure while the first photonic signal is incident on the structure to minimize the non-linear transmissivity of the first photonic signal.

13. The method of claim 12, further comprising the steps of applying a first photonic signal having a first frequency tuned near a relatively low frequency, first order band gap edge of the PBG structure to the PBG structure, and applying a second photonic signal having a second frequency that is twice the first frequency and tuned near a second resonant peak of a relatively high frequency, second order band gap edge of the PBG structure to the PBG structure.

14. The method of claim 13, further comprising the step of transferring a portion of energy from the second photonic signal to the first photonic signal within the PBG structure.

15. The method of claim 14, further comprising the step of non-linearly amplifying a forward-propagating photonic signal at the first frequency within the PBG structure to increase the non-linear transmissivity of the first signal.

16. The method of claim 13, comprising the step of imposing a phase difference of $-\pi/2$ radians between the first and second photonic signals to maximize the increase in the non-linear transmissivity of the first photonic signal.

17. The method of claim 16, comprising the step of setting an intensity of the second photonic signal at a level that is at least an order of magnitude higher than an intensity level of the first photonic signal.

18. The method of claim 16, further comprising the step of pulsing the the first and second photonic signals applied to the PBG structure.

19. The method of claim 11, wherein the first and second photonic signals exchange energy with each other and with the PBG structure based on a non-linear $\chi^{(2)}$ response of the PBG structure.

20. A device for controlling a non-linear reflectivity of a first photonic signal, comprising:

a photonic band gap (PBG) structure including a plurality of material layers exhibiting a low frequency, first order band gap edge near a frequency of the first photonic signal, and a high frequency, second order band gap edge; and a second photonic signal for controlling the non-linear reflectivity of the first photonic signal in response to applying the second photonic signal to and removing the second photonic signal from the PBG structure while the first photonic signal is incident on the PBG structure, wherein the first photonic signal and the second photonic signal exchange energy with one another and with the PBG structure.

21. The device of claim 20, wherein the plurality of material layers includes a plurality of first material layers each having a first refractive index, and a plurality of second material layers each having a second refractive index greater than the first refractive index.

22. The device of claim 21, wherein the first and second material layers are arranged in a periodically alternating manner.

23. The device of claim 22, wherein the PBG structure is a half-quarter wave PBG structure of N periods.

24. The device of claim 20, wherein the first and second photonic signals exchange energy with each other and with the PBG structure based on a non-linear $\chi^{(2)}$ response of the PBG structure.

25. A device for controlling a non-linear transmissivity of a first photonic signal, device, comprising:

a photonic band gap (PBG) structure including a plurality of material layers exhibiting a low frequency, first order band gap edge near a frequency of the first photonic signal, and a high frequency, second order band gap edge; and a second photonic signal for controlling the non-linear transmissivity of the first photonic signal in response to applying the second photonic signal to and removing the second photonic signal from the PBG structure while the first photonic signal is incident on the PBG structure, wherein the first photonic signal and the second photonic signal exchange energy with one another and with the PBG structure.

26. The device of claim 25, wherein the plurality of material layers includes a plurality of first material layers each having a first refractive index, and a plurality of second material layers each having a second refractive index greater than the first refractive index.

27. The device of claim 26, wherein the first and second material layers are arranged in a periodically alternating manner.

28. The device of claim 25, wherein the PBG structure is a half-quarter wave PBG structure of N periods.

29. The device of claim 25, wherein the first and second photonic signals exchange energy with each other and with the PBG structure based on a non-linear $\chi^{(2)}$ response of the PBG structure.

30. A method of generating amplified photonic beams using a photonic band gap (PBG) structure, comprising the steps of:

applying a photonic pump signal having a frequency turned near a relatively low frequency, photonic band gap edge of the PBG structure to the PBG structure; and applying a photonic control signal having a frequency tuned near a relatively high frequency, photonic band gap edge of the PBG structure to the PBG structure, whereby forward and reverse propagating beams are generated as a result of a non-linear interaction including an exchange of energy between the photonic pump and control signals and the PBG structure, the forward and reverse propagating beams emerging from opposing faces of the PBG structure as transmitted and reflected beams, respectively, the transmitted and reflected beams each having an intensity level that is greater than that of the pump signal.

31. The method of claim 30, wherein the photonic pump and control signals exchange energy with each other and with the PBG structure based on a non-linear $\chi^{(2)}$ response of the PBG structure.

* * * * *